P. F. PILLINER.
COMBINATION TOOL.
APPLICATION FILED MAY 21, 1909.
951,200.
Patented Mar. 8, 1910.
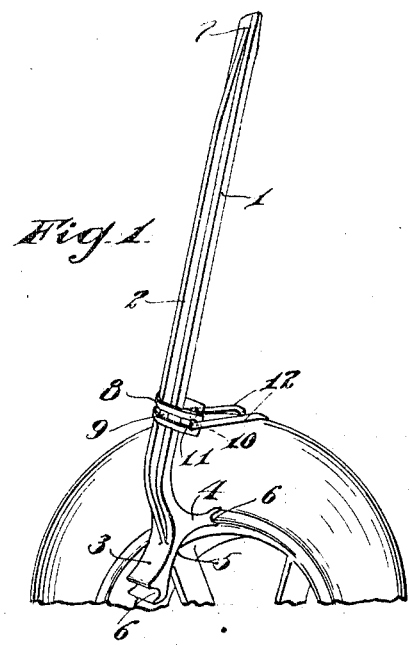
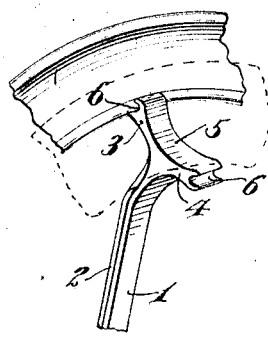
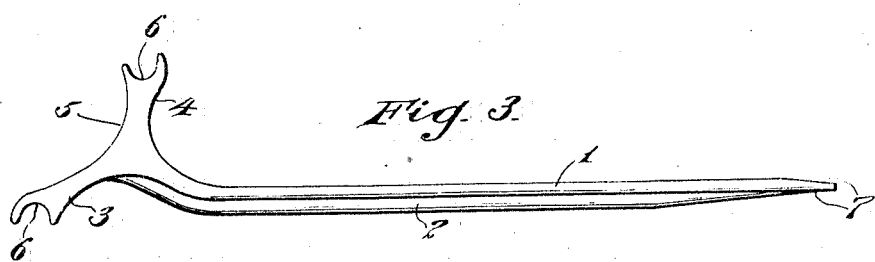
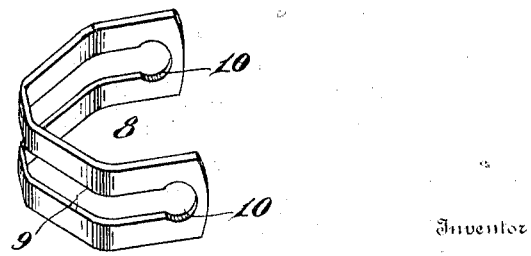
Witnesses
Theo. Rosemand.
J. A. L. Mulhall.
Inventor
Philip F. Pilliner,
By Joshua R. H. Potts
Attorney

UNITED STATES PATENT OFFICE.

PHILIP F. PILLINER, OF PHILADELPHIA, PENNSYLVANIA.

COMBINATION-TOOL.

951,200.  Specification of Letters Patent.  Patented Mar. 8, 1910.

Application filed May 21, 1909. Serial No. 497,415.

*To all whom it may concern:*

Be it known that I, PHILIP F. PILLINER, a citizen of the United States, residing at Philadelphia, in the county of Philadelphia and State of Pennsylvania, have invented certain new and useful Improvements in Combination-Tools, of which the following is a specification.

My invention relates to an improved combination tool, the object of the invention being to provide a combination tool adapted for manipulating tires, such as heavy pneumatic tires on motor vehicles, and is designed for holding the tire while inserting or repairing lugs and valves, for forcing the tire onto the rim, and for prying the tire off of the rim.

With these objects in view, the invention consists in certain novel features of construction, and combinations and arrangements of parts as will be more fully hereinafter described and pointed out in the claims.

In the accompanying drawings, Figure 1, is a perspective view illustrating my improved tool in one of its operative positions. Fig. 2, is a similar view showing the tool in another operative position. Fig. 3, is a view in elevation of the tool, and Fig. 4, is a detail view of the slide bracket removed.

1 represents the handle portion of my improved tool which is made with a strengthening web 2, and at one end is provided with extensions 3 and 4 respectively. The end face of the tool is curved in the arc of a circle as shown at 5, and the ends of the extensions 3 and 4 are recessed or notched as shown at 6, said recesses or notches being so shaped as to grip the rim of a wheel in manipulating a tire.

It will be noted that the handle 1, where it joins the extensions 3 and 4, is curved in the arc of a circle toward the extension 4, so as to properly position the handle and extension 4 in the manipulation of a tire while repairing or replacing lugs and valves, and this operation of the device is shown most clearly in Fig. 1. The opposite end of the handle is tapered as shown at 7, so as to adapt this end of the tool for insertion between a tire and rim to pry the tire off of the rim.

8 represents a slide bracket, which comprises a single bar of metal bent around the handle 1, and having a longitudinal slot 9, with the ends of said slot enlarged as shown at 10, to receive the connecting member 11 of the double hook 12, and this connecting member of the double hook is wider than the normal width of slot 9, so as to prevent disconnection of the hook from the bracket, when the latter is removed from the tool.

In assembling, the slotted portion of the bracket is spread to admit the double hook, and is then forced back to normal position, so as to lock the bracket and hook together, and yet permit a pivotal movement of the hooks within the enlarged portions 10.

In manipulating a tire to repair or replace the lugs and valves, the tool is positioned as shown in Fig. 1, in which the recessed end of extension 4 engages the wheel rim and the hooks 12 engage the tire, so that when the tool handle is swung across the rim, the hooks will draw the tire away from the rim, so that ready access may be had to the inner tube, and to the lugs and valves.

In placing a tire on a rim, the notched or recessed end of extension 3 is placed in engagement with the wheel rim as shown in Fig. 2, and the curved portion 5 in engagement with the tire, and then by swinging the free end of the handle 1 upward, the tire will be forced onto the rim. By removing bracket or slide 8 and hooks 12, and reversing the tool, the beveled or reduced end 7 may be forced under a tire, and the latter pried from the rim.

It will thus be observed that my improved device is capable of a number of uses in manipulation of wheel tires, and is of extremely simple construction, easy to manipulate, and strong and durable in use.

Various slight changes might be made in the general form and arrangements of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. A tool of the character described, comprising a handle, extensions at both sides of said handle at one end, said extensions having notches or recesses in their ends, said notches extending across and throughout the width of the extensions and forming wheel engaging fulcrum points and the end of said tool, forming one side of said extensions, being curved in the arc of a circle, and a tire engaging hook adjustably mounted on said handle substantially as set forth.

2. A tool of the character described, comprising a handle having a curved end, a tire engaging hook adjustably mounted on said handle, extensions projecting in opposite directions from said curved end, and notches in the ends of said extensions, said notches extending across and throughout the width of the extensions and forming wheel engaging fulcrum points.

3. A tool of the character described, comprising a handle, notched extensions at both sides of the handle at one end forming wheel rim engaging fulcrum points, a bracket mounted to slide on said handle, and hooks pivotally supported in said bracket.

4. A tool of the character described, comprising a handle, a notched extension at one end of the handle, a slide bracket bent around said handle and having a longitudinal slot therein, the ends of said slot enlarged, and a double hook pivotally supported in the enlarged portions of said slot and having its intermediate pivotal portion projecting across the handle.

5. A tool of the character described, comprising a handle, a longitudinal web on said handle, curved extensions at one end of said handle projecting in opposite directions, notches or recesses in the ends of said extensions forming wheel rim engaging fulcrum points, a slide bracket on said handle, and a double hook pivotally supported in said bracket.

In testimony whereof I have signed my name to this specification in the presence of two subscribing witnesses.

PHILIP F. PILLINER.

Witnesses:
H. KRENKEL,
J. A. L. MULHALL.